(12) United States Patent
Augustsson

(10) Patent No.: US 6,421,482 B1
(45) Date of Patent: Jul. 16, 2002

(54) DEVICE FOR REFLECTING LIGHT

(75) Inventor: Torsten Augustsson, Upplands-Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/468,843

(22) Filed: Dec. 22, 1999

(30) Foreign Application Priority Data

Dec. 23, 1998 (SE) ................................................ 9804558

(51) Int. Cl.$^7$ ................................................ G02B 6/26
(52) U.S. Cl. ............................ 385/48; 385/31; 385/39; 385/47; 385/129
(58) Field of Search ............................ 385/15, 31, 32, 385/39, 47, 48, 129, 131, 132

(56) References Cited

U.S. PATENT DOCUMENTS

| | | | |
|---|---|---|---|
| 3,589,794 A | * 6/1971 | Marcatili | 350/96 |
| 3,841,758 A | * 10/1974 | Gievers | 356/106 |
| 4,179,185 A | 12/1979 | Hawk | |
| 4,445,780 A | * 5/1984 | Burns | 356/350 |
| 5,479,291 A | * 12/1995 | Smith et al. | 359/333 |
| 5,818,986 A | 10/1998 | Asawa et al. | |
| 5,917,979 A | * 6/1999 | Prucnal | 385/122 |
| 6,157,762 A | * 12/2000 | Gabitov et al. | 385/123 |

FOREIGN PATENT DOCUMENTS

WO     WO 9725638 A2     7/1997

OTHER PUBLICATIONS

*Opt. Spectrosc.* (USSR) 58 (5), May 1985, pp. 675–677, L.V. Iogansen and F.A. Uvarov, "Multimode fiber interferometers".

*Journal of Lightwave Technology*, vol. 13, No. 4, Apr. 1995, pp. 615–627, Lucas B. Soldano and Erik C.M. Pennings, "Optical Multi–Mode Interference Devices Based on Self–Imaging: Principles and Applications".

*Journal of Lightwave Technology*, vol. 15, No. 1, Jan. 1997, pp. 148–153, M.V. Bazylenko, M. Gross, E. Gauja, and Pak L. Chu, "Fabrication of Light–Turning Mirrors in Buried–Channel Silica Waveguides for Monolithic and Hybrid Integration".

\* cited by examiner

*Primary Examiner*—Rodney Bovernick
*Assistant Examiner*—Sung Pak
(74) *Attorney, Agent, or Firm*—Nixon & Vanderhye P.C.

(57) ABSTRACT

A device for reflecting light waves to used when building optical systems for various applications and special devices, is built on a substrate and has a planar structure. It comprises a light power coupler of the MMI-type, configured as a rectangular plate at or in the surface of the substrate. The coupler splits light incoming on an input terminal into two equal portions, each portion delivered on an output terminal. Also the coupler combines light incoming on two output terminals into combined light delivered on the input terminal. A loop is connected to the two output terminals for conducting light delivered on each one of these output terminals back into the other one of these output terminals. The loop is a planar waveguide built on the substrate, connected to an edge surface of the coupler. The loop has an outer contour comprising a multitude of linear segments and it can also have an inner contour having a polygon shape. The shape of the loop can be formed by folding a strip having a uniform width at least twice, the folds being symmetrically made.

28 Claims, 3 Drawing Sheets

Vent etched to produce total reflection for θ angle deflection of the light according to Fig.4a.

DEVICE FOR REFLECTING LIGHT

The present invention relates to a device for reflecting light also called an optical reflection plug.

BACKGROUND

When building optical systems for various applications and special devices, there may be a need for providing a total reflection of light. At present there is no good established method to produce a total reflection of light independently of the wavelength of the light. Metallizing the end of the waveguide by aluminum has been mentioned as a possible way, see M. V. Bazylenko, M. Gross, E. Gauja, and P. L. Cchu, "Fabrication of Light-Turning Mirrors in Buried-Channel Silica Waveguides for Monolithic and Hybrid Integration", J. Lightwave Technol. Vol. 15(1), pp. 148–153, 1997. When making optical integrated circuits having integrated waveguides metallization of vertical end surfaces is a costly and complicated process. Also the lifetime can be questioned. A method of producing total reflection for a relatively narrow wavelength range is to use Bragg gratings. Using special designs such as varying the grating period in the propagation direction a total reflection over a wider range could possibly be achieved. However, it is relatively costly to produce Bragg gratings and the production thereof requires costly equipment as well as a large area on the chip in the case where the totally reflecting structure is to be incorporated in an integrated circuit structure.

In L. V. Iogansen et al., "Multimode fiber interferometers", Optics and Spectroscopy, Vol. 58, No. 5, May 1985 optical reflectors using resonant tunnel loop reflection are disclosed. Simple loop reflectors are shown in FIG. 5 in this document. There are some losses in such a loop reflector comprising loss in the waveguide, loss in the tunnel-coupling section, and loss of radiation in the loop.

In the Japanese patent application JP 8-274398 a semiconductor laser module is disclosed. It has a loop mirror comprising a four-terminal fiber coupler and a fiber loop connected to the coupler.

SUMMARY

It is an object of the invention to provide a device for reflecting light waves to be easily incorporated in integrated optical circuits.

A device for reflecting light waves is built on a substrate and has a planar structure. It comprises a light power coupler operating as a power splitter, preferably of the MMI-type, and configured as a rectangular plate at or in the surface of the substrate. The coupler splits light incoming on an input terminal into at least two equal portions, each portion delivered on an output terminal. Also the coupler combines light incoming on at least two output terminals into combined light delivered on the input terminal. A loop is connected to two output terminals for conducting light delivered on each one of these output terminals back into the other one of these output terminals. The loop is a planar waveguide built on the substrate, connected to an edge surface of the coupler. The loop has preferably an outer contour comprising a multitude of linear segments and it can also have an inner contour comprising a multitude of linear segments. The shape of the loop can e.g. be formed by folding a strip having a uniform width at least twice, the folds being symmetrically made.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
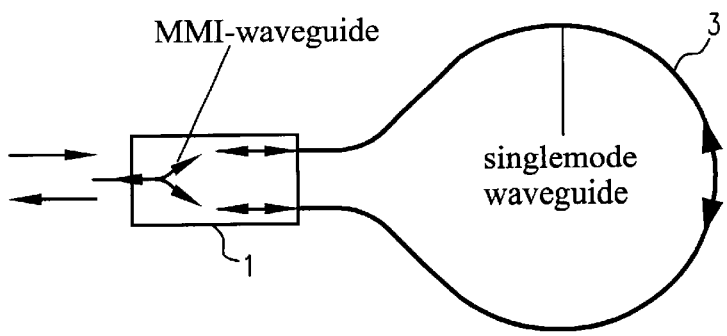
FIG. 1 is a schematic view from above illustrating the principle of a loop mirror structure.

In FIG. 1 the basic construction of a loop mirror is illustrated. A loop mirror comprises a 1×2 optical coupler 1, in the preferred case a 1×2 MMI (Multi Mode Interference) waveguide coupler. The coupler operates as an equal power splitter having one input terminal and two output terminals. The two output terminals are connected to each other through a light waveguide loop 3. MMI devices are described in e.g., L. B. Soldano and E. C. M. Pennings, "Optical Multi-Mode Interference Devices Based on Self-Imaging: Principles and Application," J. Lightwave Technol. Vol. 13(4), pp. 615–627, 1995, and the published International patent application WO97/35220. The waveguide 3 may, as is conventional, be an optical fiber, but in the embodiment considered herein, it is made as a planar structure to be used, e.g., in PLCs (Planar Lightwave Circuits).

The waveguide 3 is then made as a strip of a first material embedded in a layer of a second material having a different refractive index, the layer and strip being produced at or in the surface of a substrate, basically like electronic integrated circuits. The second material can be air and then the strip can be produced by etching a layer applied to the surface of the substrate. Typically however, the waveguide is made as a rectangular waveguide comprising a core having a rectangular cross-section made by etching a layer having a suitable refractive index and further comprising an undercladding layer and an overcladding layer, these different layers being formed of e.g. doped silicon oxide material or polymer layers.

The waveguides used, both for conducting light at the input side of the coupler 1 and in the reflecting loop are preferably always designed to be single-mode or monomode type.

The loop 3 as illustrated in FIG. 1 is configured as a curved strip having a smooth path joining the terminal portions at the outputs of the coupler, these terminal portions being parallel to each other. The curved smooth portion of the loop has over a substantial part thereof the shape of part of a circle and thus has there a constant curvature. The maximum curvature must always be smaller than a value set by the difference of the refractive index of the waveguide and that of the surrounding material, since larger curvatures and thus a smaller radius of the loop would give unacceptable losses. For a small radius a too large portion of the energy of light propagating in the reflecting loop would leak out of the loop. Furthermore, if the difference of the refractive index n of the waveguide and that ($n_0$) of the surrounding material is large the loop will have a reasonably small diameter. For instance, for a relative refractive index difference of 1.5%, the diameter can be smaller than 4 mm. For smaller refractive index differences the circular loop structure will have a larger diameter and can in some cases take a too large space on a substrate.

Figure 2:
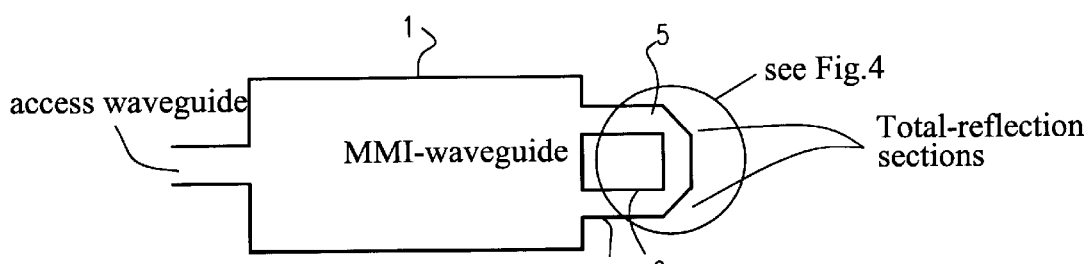
FIG. 2 is a view from above of a loop mirror made as a planar structure on a substrate.
Figure 3:
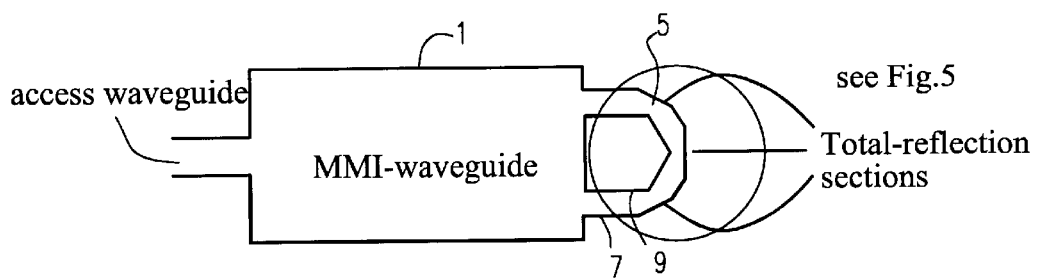
FIG. 3 is a view from above of an alternative embodiment of a loop mirror made as a planar structure.

Instead the waveguide of the loop can be made to have substantially a polygon shape, as is illustrated by the embodiments illustrated in the plan views of FIGS. 2 and 3. The polygon loop 5 is also here single-mode and comprises a curved stripshaped region having parallel and identically shaped connection regions connected to the two outputs of the coupler 1. The waveguide 5 is limited by an exterior contour line 7 and an inner contour line 9, each being a non-closed polygon line comprising a plurality of straight linear segments. The start and end line segments of each polygon line 7, 9 are thus parallel to each other and extend from the output side of the coupler 1 at right angles thereto. The two contour lines 7, 9 are, like the loop of FIG. 1, symmetrical about a symmetry line extending from the center of the line connecting the outputs of the coupler 1, i.e. about the longitudinal axis of the coupler in the case where it is an MMI-device.

Figure 4A:
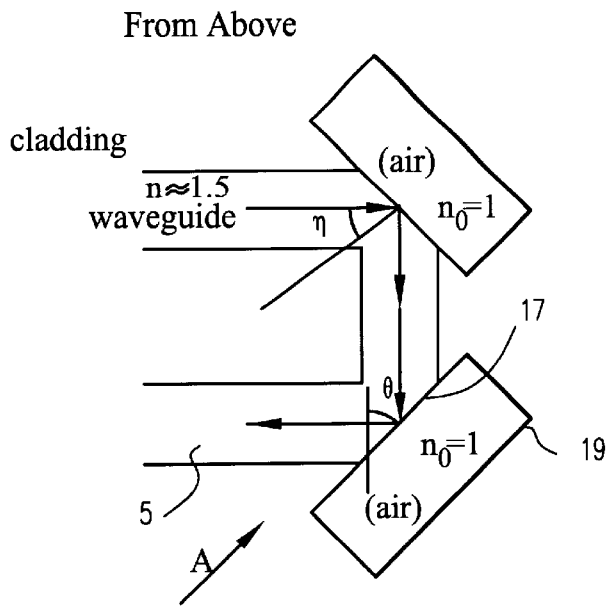
FIG. 4a is an enlarged view of the loop waveguide of FIG. 2 illustrating the reflection conditions.

In the loop waveguide structure 5 of FIG. 2 the exterior contour line 7 of the waveguide comprises straight linear pieces having directions deviating from each other by 45° and thus forming angles of 135° to each other, at the four corners of the totally three straight line segments required to connect the parallel start and end segments. The inner contour line 9 has only a total of three linear segments, one segment connecting the start and end segments at angles of 90°. The corners of the inner contour line are symmetrically located in relation to two corresponding corners of the exterior contour line 7, these two corners connecting the line segments connected directly to the start and end segments. The propagation of light in such a waveguide is illustrated in FIG. 4a. It appears from FIG. 4a, that for the wavelength of the used light, the material of the waveguide 3 should have such a refractive index n in relation to the refractive index $n_0$ the surrounding material, e.g. air, that the light propagating in the waveguide will be totally reflected for all incident angles η larger than about 45°, i.e. practically for all incident angles which are larger than an angle somewhat smaller than 45°, see A. Stano, L. Faustini, C. Coriasso, D. Campi, C. Cacciatore, "OPTIMIZED WAVEGUIDE-INTEGRATED MIRRORS", Proc. ECIO '97 EWF3, Stockholm, 1997, for a detailed discussion.

Figure 4B:
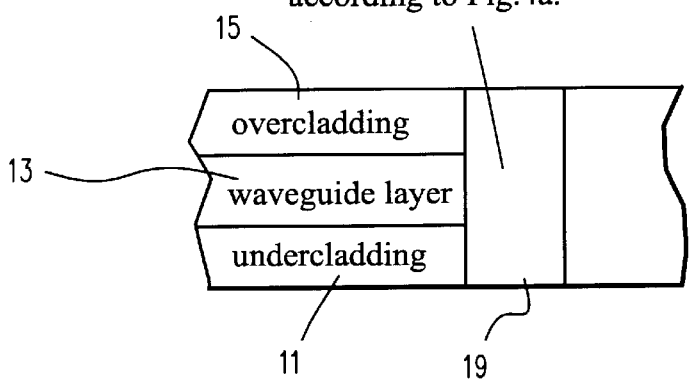
FIG. 4b is a sectional partial view of the loop waveguide as seen in the direction of the arrow A of FIG. 4a illustrating an embodiment of construction of the loop, in particular at the reflecting surfaces, FIG. 5 an enlarged view of the loop waveguide of FIG. 3 illustrating the reflection conditions.

In FIGS. 4a and 4b also a construction of the loop waveguide 5 comprising layers on a substrate, not shown, is illustrated. The waveguide is constructed of an undercladding 11, a core or waveguide layer 13 and an overcladding 15. The layers forming the undercladding, the waveguide core and the overcladding are etched to have the required shape. At the reflecting surfaces 17 of the loop etched rectangular recesses or vents 19 are provided which have accurately flat surfaces at the waveguide, these flat surfaces also being accurately perpendicular to the large surfaces of the structure.

Figure 5:
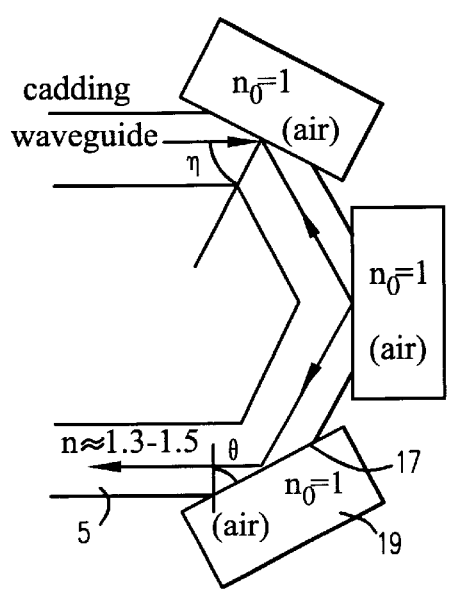

If the total reflection condition cannot be fulfilled in the waveguide layout of FIGS. 2 and 4a, a structure requiring a total reflection only for all incident angles η larger than somewhat more than 30° can be used, as is illustrated by the embodiment of FIG. 3. Here the exterior contour line 7 comprises seven linear segments located in angles of 150° to each other what corresponds to the condition that a linear segment of the contour has a direction deviating by an angle of 30° from those of the line segments connected to the considered linear segment. The interior contour line 9 comprises five linear segments having directions deviating from each other by 60° or located in angles of 120° to each other. The corners of the interior contour line 9 are also here located symmetrically in relation to segments of the exterior contour line, on the line passing such a segment centrally at right angles. The propagation of light in this loop structure is illustrated in FIG. 5. The waveguide can be made to include reflective surfaces to air like the embodiment of FIG. 4a by providing recesses 19 from the surface of the structure.

The contour lines of the structures of FIGS. 2 and 3 can be obtained by folding a strip of material having a uniform width two and three times respectively. This can easily be generalized to folding more times, say n times. Then the resulting structure will comprise an outer contour line of 2n+1 line segments and an interior contour having n+1 line segments. The segments of the exterior contour have directions deviating from those of the adjacent segments by angles of 90°/n and the segments of the interior contour have directions deviating by angles of 2·90/n. The used light must be totally reflected at the border surface between the material of the waveguide and the surrounding material at all incident angles about 90°/n or larger than somewhat more than 90°/n.

Figure 6:
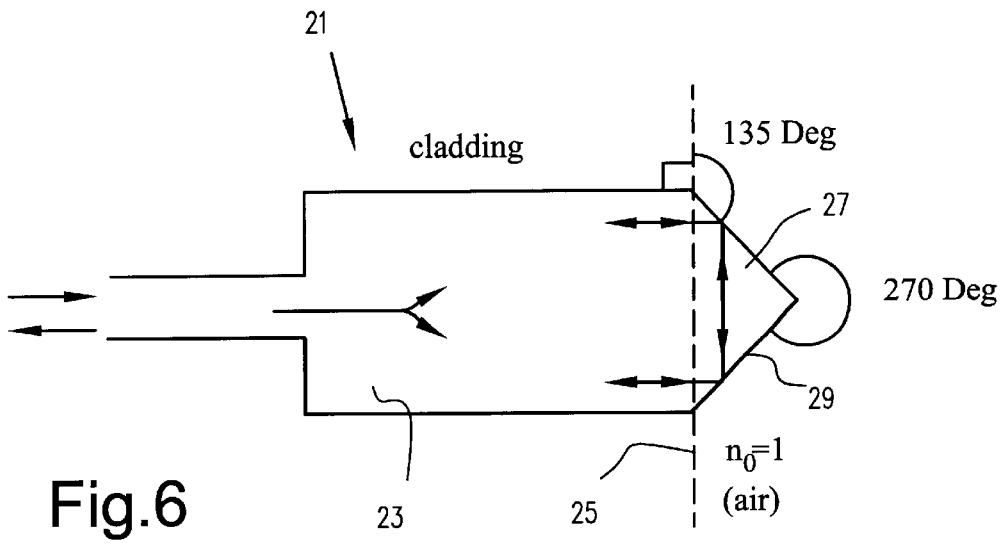
FIG. 6 is a view from above of a loop mirror having a loop integrated in a coupler.
Figure 7:
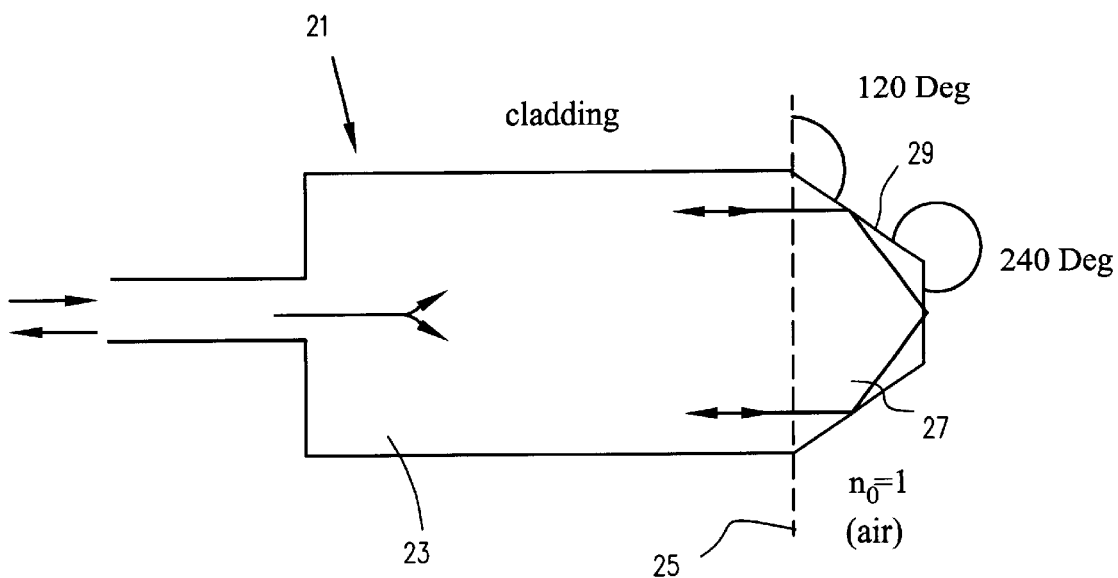
FIG. 7 is a view from above of an alternative embodiment of a loop mirror having a loop integrated in a coupler.

A simplified reflecting structure can also be incorporated directly in a MMI-coupler, see FIGS. 6 and 7. The MMI-coupler 21 is a planar structure and comprises a thin layer of a material having a refractive index adapted to be higher than that of the surrounding material. The layer has for a simple coupler a rectangular shape and forms the main part 23 of the reflecting structure. The rectangular body 23 is adapted so that for light is incoming into the layer centrally at a short side, two images of the incoming light wave will appear at the opposite short side at places symmetrically located in relation to the longitudinal direction of the rectangular shape. In FIGS. 6 and 7 these pictures appear at the line 25.

In order to make such a simple reflecting structure the rectangular shape 23 is supplemented with a polygon shape 27 at said opposite short side. The polygon has a free polygon line 29, which is symmetrical in relation to the longitudinal direction of the rectangular body 23. The polygon shape is in FIG. 6 an isosceles triangle having a 90°-angle at the free corner. In the embodiment of FIG. 7 it is a symmetric trapezium having its oblique sides located in directions deviating from the direction of the long sides of the rectangular body 23 by angles of 30°, i.e. from the longitudinal direction. For suitable refractive index conditions, as outlined above, light from the two images at the line 25 will be reflected by the oblique sides of the outer polygon shape 29, as is illustrated in FIGS. 6 and 7.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A device for reflecting light waves propagating in an optical waveguide, the device comprising:
    a substrate;
    a planar light power coupler formed on the substrate and using multi-mode interference for light propagating inside the coupler, including a rectangular plate at the surface of the substrate, the rectangular plate being surrounded by a material and having a constant refractive index adapted to the refractive index of the surrounding material, a single input terminal formed at a center of an input side of the rectangular plate, and two output terminals formed at an opposite, output side of the rectangular plate, the light power coupler splitting light incoming on the single input terminal into two shares of light, each share delivered on one of the two output terminals in a direction perpendicular to the output side of the rectangular plate, and combining light incoming on the output terminals into combined light delivered on the single input terminal, and
    a loop, coupled to the two output terminals, for conducting light delivered on each of the two output terminals back into a different one of the two output terminals so that the combined light from the light conducted back to the two output terminals and delivered on the single input terminal has substantially the same power as the light incoming on the single input terminal.

2. The device of claim 1, wherein the loop is a strip having smooth curved outlines, a major portion of the loop formed as part of a circle and connection portions of the strips located at the output side of the rectangular body being perpendicular to said output side.

3. The device of claim 1, wherein the loop is a strip having polygon outlines comprising only straight line segments located in angles to each other.

4. The device of claim 1, wherein the loop is a strip having polygon outlines comprising straight line segments located at angles to each other.

5. The device of claim 1, wherein the loop has a convex polygon outline comprising only straight line segments located in angles to each other, one of the straight line segments being a large side directly connected to that side of the rectangular plate comprised in the light power coupler at which the output terminals are formed, the convex polygon being symmetric in relation to a center line of the rectangular plate.

6. The device of claim 5, wherein the rectangular plate comprised in the light power coupler and the planar waveguide forming the loop are integrated into one unit plate having a uniform refractive index.

7. The device of claim 6, wherein the unit plate has an outline corresponding to that of a combination of a rectangle and an isosceles triangle, the isosceles triangle being located at one of the sides of the rectangle.

8. The device of claim 6, wherein the unit plate has an outline corresponding to that of a combination of a rectangle and a trapezoid, the trapezoid being located at one of the sides of the rectangle.

9. The device of claim 1, wherein the loop has a convex polygon outline comprising straight line segments located at angles to each other.

10. The device of claim 9, wherein one of the straight line segments being coupled to one of the output terminals of the light power coupler, the convex polygon being symmetric in relation to a center line of the rectangular plate.

11. A device for reflecting light waves propagating in an optical waveguide, the device comprising
    a light power coupler, having an input terminal and two output terminals, for splitting light incoming on the input terminal into two shares of light, each share delivered on one of the two output terminals, and combining light incoming on the two output terminals into combined light delivered on the input terminal, and
    a planar waveguide loop formed at or in the surface of a substrate, coupled to the two output terminals, the loop conducting light delivered on each of the two output terminals back into a different one of the two output terminals and having a shape of a strip extending from one of the two output terminals to a different one of the two output terminals, the loop having a polygonal shape where outer and inner polygon outlines include straight line segments located in angles to each other.

12. The device of claim 11, wherein the polygon outlines of the strip correspond to outlines of a strip which has a uniform width and is folded at least twice.

13. The device of claim 11, wherein the outer polygon outline has a convex shape.

14. A device for reflecting light waves propagating in an optical waveguide, the device comprising:
    a substrate;
    a planar light power coupler formed on the substrate and using multi-mode interference for light propagating inside the coupler, including a rectangular area at the surface of the substrate having a single input terminal formed at a center of an input side of the rectangular area and two output positions formed at an opposite, output side of the rectangular area, the light power coupler splitting light incoming on the single input terminal into two shares of light, each share delivered at one of the two output positions, and combining light incoming at the output positions into combined light delivered on the single input terminal; and
    a reflector, coupled to the output side of the rectangular area, the reflector reflecting light delivered at each of the two output positions back to a different one of the two output positions, the reflector having a convex polygon shape including an outline comprising straight line segments located in angles to each other, one of the straight line segments being a large side directly coupled to and coinciding with the output side of the rectangular area, the convex polygon shape being symmetric in relation to a center line of the rectangular plate,
    wherein the light coupler and the reflector form a single unit plate having a uniform refractive index.

15. The device of claim 11, wherein the single unit plate has an outline corresponding to that of a combination of a rectangle and an isosceles triangle, the isosceles triangle coupled to one of the sides of the rectangle.

16. The device of claim 1, wherein the single unit plate has an outline corresponding to that of a combination of a rectangle and a trapezoid, the trapezoid located at one of the sides of the rectangle.

17. A device for reflecting light waves propagating in an optical waveguide, comprising:
   a light power coupler, having an input terminal and two output terminals, for splitting light incoming on the input terminal into at least two shares of light, each share delivered on one of the two output terminals, and combining light incoming on the two output terminals into combined light delivered on the input terminal;
   a loop, coupled to the two output terminals, for conducting light delivered on each of the output terminals back into a different one of the output terminals,
   wherein the loop is a planar waveguide formed at or in the surface of a substrate having a refractive index adapted to the refractive index of material surrounding the planar waveguide and extends from one of the two output terminals to a different one of the two output terminals, and
   wherein the loop is polygon-shaped with straight line segments located at angles to each other.

18. The device of claim 17, wherein the polygon-shaped loop includes only straight line segments located in angle to each other.

19. Apparatus for reflecting light, comprising:
   a light power coupler, having an input terminal and two output terminals, for splitting light received at the input terminal and delivering the split light to each output terminal, and
   a planar waveguide loop, coupled to the output terminals, for conducting light delivered on each output terminal to the other output terminal, and including two linear segments coupled at one end to a respective one of the output terminals, and at the other end to another segment at an angle other than zero degrees.

20. The apparatus in claim 19, wherein the light power coupler is substantially rectangular.

21. The apparatus in claim 19, wherein the light power coupler is a multi-mode interference (MMI) waveguide coupler.

22. The apparatus in claim 1, wherein the planar waveguide loop is a polygon.

23. The apparatus in claim 1, wherein the planar waveguide loop is a strip having polygon outlines including straight line segments located at angles to each other.

24. The apparatus in claim 1, wherein the planar waveguide loop has a convex polygon outline comprising straight line segments located at angles to each other.

25. The apparatus in claim 1, wherein the planar waveguide loop has a shape of a strip, the outline of the strip having a uniform width and folded at least twice.

26. The apparatus in claim 1, wherein the light power coupler and the planar waveguide loop are integrated into one unit plate.

27. The apparatus in claim 26, wherein the unit plate has an outline corresponding to that of a combination of a rectangle and an isosceles triangle, the isosceles triangle being located at one side of the rectangle.

28. The apparatus in claim 27, wherein the unit plate has an outline corresponding to that of a combination of a rectangle and a trapezoid, the trapezoid being located at one side of the rectangle.

* * * * *